Jan. 13, 1953     A. McMILLAN     2,625,137
STEAM ENGINE SLIDE VALVE CONTROL DEVICE
Filed Nov. 21, 1950

INVENTOR.
Alfred McMillan
BY Victor J. Evans
ATTORNEYS

Patented Jan. 13, 1953

2,625,137

UNITED STATES PATENT OFFICE 2,625,137

STEAM ENGINE SLIDE VALVE CONTROL DEVICE

Alfred McMillan, New York, N. Y.

Application November 21, 1950, Serial No. 196,793

2 Claims. (Cl. 121—171)

This invention relates to control devices for slide valves of steam engines, and in particular an elongated spiral gear slidably mounted for longitudinal travel on a crank shaft with the gear controlled by a clutch collar positioned to be actuated by a hand lever and with the gear meshing with a pinion on the slide valve eccentric shaft whereby the position of the slide valve in relation to the piston in the cylinder of the engine is readily adjustable.

The purpose of this invention is to provide means for setting slide valves through the eccentric in relation to the crank shaft whereby the position of the slide valve is adjustable to facilitate starting, stopping, and reversing a steam engine and also to facilitate increasing and decreasing the speed of the engine as may be required for different purposes.

It is not unusual for the intake valve port of a steam engine to be completely closed when the eccentric is on a dead center and this port normally only begins to open when the piston starts the next stroke. In numerous instances it is also desirable particularly when the load is increased or decreased to actuate the slide valve to the full open position or substantially to completely closed position without changing the speed of the engine, and in other instances it is desired to increase or decrease the speed of the engine to compensate for the different conditions under which the engine is operating. With this thought in mind this invention contemplates an auxiliary attachment mounted between the crank shaft and the slide valve operating instrumentalities whereby the position of the slide valve in relation to the positions of the pistons in the cylinders is readily adjustable.

The object of this invention is, therefore, to provide means for providing a slide valve extension adjusting device on a steam engine whereby the position of the slide valve in relation to the crank shaft is readily adjustable.

A further object of the invention is to provide an attachment for adjusting the position of the slide valve eccentric in relation to the crank shaft of a steam engine that may be incorporated in engines now in use.

A further object of the invention is to provide a manually actuated adjustment for controlling the position of a slide valve of a steam engine in relation to a crank shaft for increasing and decreasing the speed of the engine and for facilitating starting, stopping, and reversing the engine, which is of a comparatively simple and economical construction.

With these and other objects and advantages in view the invention embodies a pair of spiral gears one of said gears positioned on the eccentric shaft of a slide valve of a steam engine and the other on an extended end of the crank shaft of the engine and provided with a clutch collar through which it may be actuated by a hand lever to different positions on the crank shaft for adjusting the position of the slide valve in relation to the crank shaft.

Other features and advantages of the invention will appear from the following description taken in connection with the drawings wherein.

Figure 1:
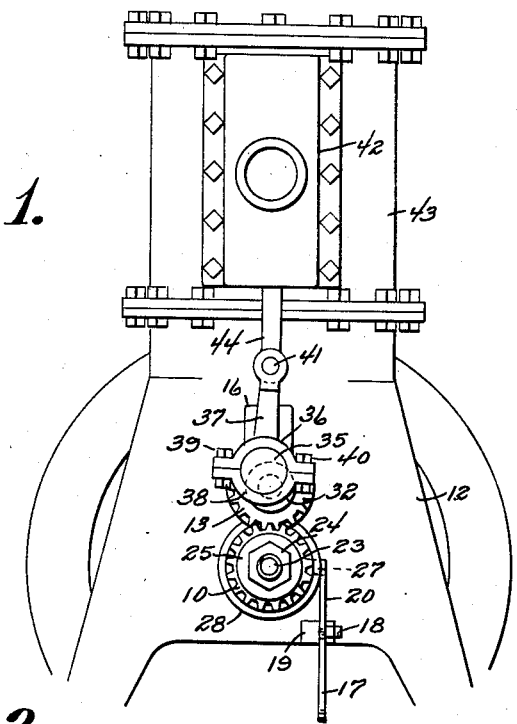
Figure 1 is an end elevational view of a steam engine showing the slide valve eccentric and engine crank shafts with the spiral gears on the said shafts, and with other parts of the engine broken away.

Referring now to the drawings wherein like reference characters denote corresponding parts a steam engine valve control device of this invention includes an elongated spiral gear 10 positioned on an extended end 11 of a crank shaft of an engine 12, a pinion 13 mounted on an eccentric shaft 14 in a bearing 15 of an arm 16 extended from the end of the engine, and a hand lever 17 pivotally mounted by a pin 18 in the end of a bracket 19 extended from the end of the engine and having an arm 20 extended from a hub portion thereof.

The gear 10 is mounted on the end 11 of the crank shaft and a key 21 carried by the shaft extends into a keyway 22 in the gear for retaining the gear in position on the shaft and at the same time providing longitudinal travel thereof in relation to the shaft.

The end 11 of the crank shaft is provided with a threaded stud 23 and a nut 24, threaded on the stud, retains the gear 10 on the end 11 of the shaft through a washer 25.

Figure 2:
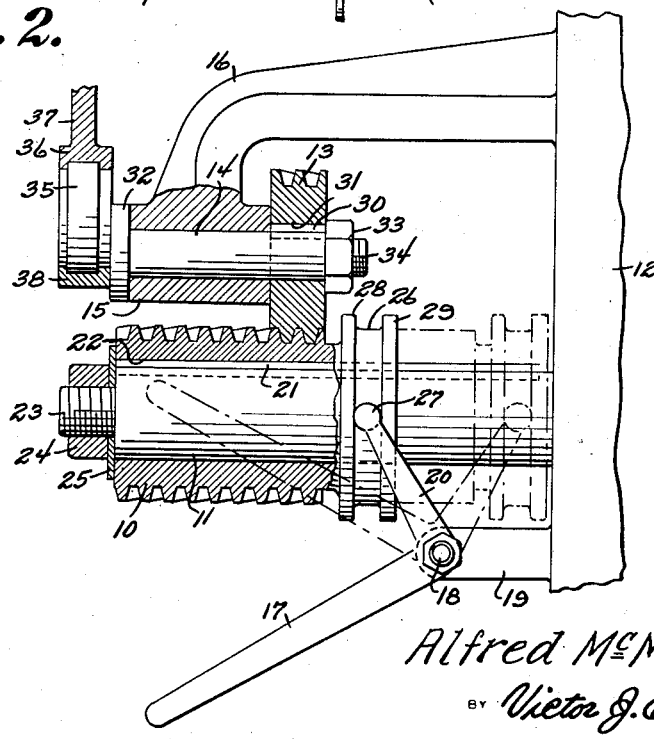
Figure 2 is a side elevational view of one end of a steam engine with parts broken away showing longitudinal sections through spiral gears with eccentric and crank shaft mounting and retaining parts on the end of the engine.

The opposite end of the gear 10 is provided with a collar 26 and a pin 27 on the end of the arm 20 extends into the collar, thereby providing means for shifting the gear longitudinally on the end 11, as indicated by the dot and dash line positions of the parts, shown in Fig. 2. The collar 26 is provided with flanges 28 and 29 between which the pin 27 operates.

The pinion 13 is secured on the eccentric shaft 14 by a key 30 that extends into a keyway 31 of the pinion and a collar 32 on the opposite end of the shaft is held against the end of the bearing 15 by a nut 33 which is threaded on a stud 34 extended from the end of the shaft.

The collar 32 is provided with an eccentrically positioned pin 35 over which the upper half 36 of a bearing on the lower end of an eccentric rod 37 is positioned. The lower half 38 of the bearing, which also extends over the pin 35 is secured to the upper half 36 by bolts 39 and 40.

The upper end of the eccentric rod 37, is connected by a pin 41 to a slide valve in the valve 42 of the head 43 of the engine by a bar 44.

By means of the present invention, there is provided a manually operated adjustment which can be used for controlling the position of a slide valve of a steam engine, and which can be used for facilitating the starting, stopping, and reversing of the engine. In the mechanism of the present invention there is provided a pair of spiral gears one of which is positioned on an eccentric shaft of a slide valve and the other is mounted on an extended end of the crankshaft of the engine. A clutch collar is provided through which a hand lever acts to adjust the position of the slide valve in relation to the crankshaft. As an example of the use of the mechanism, assume that the slide valve is arranged in dead center position. Then, the lever 17 is actuated whereby the eccentric shaft 14 will be turned through the gears 10 and 13 and this will cause the valve to move off of dead center to thereby admit steam to either end of the cylinder. Also, the operation of the engine is controlled by the lever 17.

It will be understood that modifications may be made in the design and arrangements of the parts without departing from the spirit of the invention.

What is claimed is:

1. In a steam engine valve control, an engine housing, a crank shaft journalled in the housing and having an extended end, a slide valve mounted on the housing controlling steam to the engine, an elongated spiral gear having a clutch collar on one end slidably mounted on the extended end of the crank shaft and positioned to be moved longitudinally of the shaft, an eccentric for actuating the slide valve of the engine, an eccentric shaft journalled on the housing and positioned in spaced relation and parallel to the extended end of the crank shaft, a pinion on the eccentric shaft meshing with the said elongated spiral gear, and a hand lever pivotally mounted on the housing and having a pin on an extended end thereof positioned to engage the collar on the end of the elongated spiral gear for actuating the said gear.

2. In a steam engine, the combination which comprises an engine housing, a crank shaft journalled in said housing and having an end extended from one end of a housing, a slide valve mounted on said engine housing for controlling the steam to the cylinders of the engine, an eccentric shaft journalled in an extension of the engine housing and positioned with the axis thereof parallel to the axis of the crank shaft, said shafts being spaced apart, means connecting the eccentric shaft to the slide valve of the engine, a spiral pinion positioned on the said eccentric shaft, an elongated spiral gear having a clutch collar on one end slidably mounted on the extended end of the crank shaft and keyed thereto, and a hand lever pivotally mounted on an extension at the end of the engine housing and having a pin extended from one end positioned to engage the said clutch collar for moving the said elongated spiral gear on the extended end of the crank shaft.

ALFRED McMILLAN.

REFERENCES CITED

The following references are of record in the file of this patent:

UNITED STATES PATENTS

| Number | Name | Date |
| --- | --- | --- |
| 921,649 | Peache et al. | May 11, 1909 |
| 1,641,614 | Berger | Sept. 6, 1927 |
| 1,770,441 | Todd | July 15, 1930 |